UNITED STATES PATENT OFFICE 2,593,840 m-PHTHALIMIDOMETHYL DERIVATIVES OF ANILINE, NITROBENZENE, AND NUCLEAR SUBSTITUTION PRODUCTS THEREOF

Saul R. Buc, Easton, Pa., assignor to General Aniline & Film Corporation, New York, N. Y., a corporation of Delaware No Drawing. Application December 30, 1949, Serial No. 136,165

12 Claims. (Cl. 260—326)

This invention relates to m-phthalimidomethyl derivatives of aniline, nitrobenzene and nuclear substitution products thereof as dyestuff intermediates, and to a process of preparing the same.

I have found that aniline, nitrobenzene, and substituted derivatives thereof, having the meta positions unsubstituted and containing o- and p-directing substituents in the remaining positions, readily react with N-methylolphthalimides to yield compounds which are useful as dyestuff intermediates.

It is an object of the present invention to provide m-phthalimidomethyl derivatives of anilines and nitrobenzenes as dyestuff intermediates.

A further object is to provide a process of preparing said dyestuff intermediates.

Other objects and advantages will appear hereinafter.

The above and other objects are accomplished by condensing aniline or nitrobenzene or substituted derivatives thereof having the meta positions unsubstituted and o- and p-directing substituents in the remaining positions with an N-methylolphthalimide in the presence of sulfuric acid. As a consequence, during the condensation reaction, two phthalimidomethyl groups are introduced into the unsubstituted meta-positions of the aniline or nitrobenzene.

In practicing the invention, a gram mol of aniline, nitrobenzene, or substitution product thereof, in which two of the positions meta to the amino or nitro group are unsubstituted, is dissolved in 80–100% sulfuric acid or in oleum with stirring at a temperature ranging from about 15–25° C., and to the solution is added two molecular equivalents of an N-methylolphthalimide. The mixture is allowed to stand preferably with stirring for a period of time ranging from about 12 hours to about 3 days at a temperature between 20–60° C. The mixture is then poured over ice, the precipitate filtered off, washed several times with water, and then dried, or ground with ammonia, filtered, washed with water several times, and dried. The final product may be used as such or recrystallized from any suitable solvent, such as di- or trichlorobenzene, preferably from o-dichlorobenzene.

When a nitrobenzene or substitution product thereof is employed as one of the starting materials, the final product may be reduced in the usual manner to the corresponding amine. Both the m-phthalimidomethyl derivatives of the anilines and the amines obtained by reduction of the corresponding nitro derivatives are reactive with bromaminic acid to yield acid wool dyes.

The substituted anilines and nitrobenzenes which are condensed with a methylolphthalimide are, as stated above, those containing o- and p-directing substituents, such as, for example, lower alkyl and alkoxy groups having from 1 to 4 carbon atoms, e. g., methyl, ethyl, propyl, butyl, methoxy, ethoxy, propoxy, etc.; aryloxy, e. g., phenoxy, methoxyphenoxy, p-methoxyphenoxy, p-phenoxyphenoxy, p-sulfophenoxy, etc., aralkyl, e. g., benzyl, or o-, p-, and m-methylbenzyl; hydroxyl; lower hydroxyalkyl, e. g., methylol, $\tau$-hydroxypropanol, $\beta$-hydroxypropanol, etc., and halogen, especially chlorine and bromine.

As representative anilines and nitrobenzenes characterized by the above, the following are illustrative examples:

ANILINES aniline
o-toluidine
p-toluidine
p-amino-phenol
2-chloro-p-anisidine
2-chloro-p-toluidine
2,3,4-trichloraniline
2-ethyl-p-toluidine
2,4-xylidine
2,5-xylidine
3,4-xylidine
p-phenetidine
p-anisidine
p-phenoxyaniline
4-(p-aminophenoxy)-benzene sulfonic acid
4-aminodiphenylmethane

NITROBENZENES nitrobenzene
o-nitrotoluene
p-nitrotoluene
3-chloro-p-nitrotoluene
4-nitro-m-xylene
o-nitroanisol
p-nitroanisol
o-nitrophenetole
p-nitrophenetole
p-nitro-tert.-amylbenzene
p-nitrophenol The N-methylolphthalimides which may be employed are N-methylolphthalimide itself or substituted methylolphthalimides wherein one or more substituents may be present in the 3- to 6-positions of the benzene nucleus. Thus, there are included such representative methylolphthalimides as:

N-methylol-3-methylphthalimide
N-methylol-4-methylphthalimide
N-methylol-4,5-dibromophthalimide
N-methylol-4-chlorophthalimide
N-methylol-3,4-dichlorophthalimide
N-methylol-3-nitrophthalimide
N-methylol-4-nitrophthalimide
N-methylol-5-aminophthalimide
N-methylol-6-aminophthalimide The present invention will be more fully described in conjunction with the following specific examples. It should be understood, however, that the examples are given by way of illustration only and that the invention is not to be limited by the details set forth therein.

EXAMPLE I

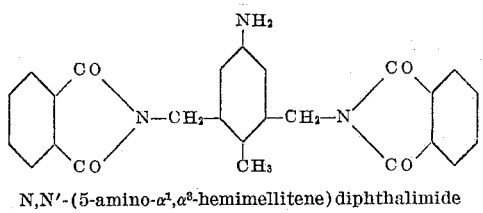

N,N'-(5-amino-$\alpha^1,\alpha^3$-hemimellitene) diphthalimide 21.4 grams of p-toluidine were dissolved in 250 mls. of concentrated sulfuric acid at 20-25° C. with stirring. To this solution, 71 grams of N-hydroxymethylphthalimide were added and the solution allowed to stand at room temperature for 24 hours. The solution was then poured over ice and the precipitate filtered off, ground with ammonia, again filtered, washed several times with water and then dried. The yield of the product, which was almost quantitive, was 81 grams. The crude product was crystallized from 3 liters of o-dichlorobenzene and chars without melting at 290° C.

Analysis for $C_{25}H_{19}N_3O_4$

|   | Calculated | Found |
|---|---|---|
| C | 70.56 | 70.71 |
| H | 4.50 | 4.65 |
| N | 9.88 | 9.74 |

EXAMPLE II

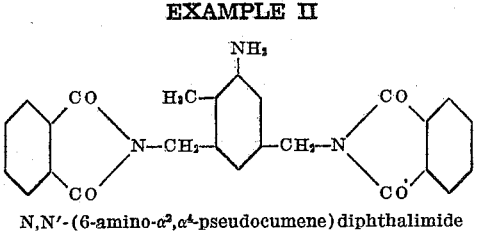

N,N'-(6-amino-$\alpha^2,\alpha^4$-pseudocumene) diphthalimide 177 grams of N-hydroxymethylphthalimide were dissolved in 650 mls. of concentrated sulfuric acid with stirring. To this solution 53 mls. of o-toluidine were added from a dropping funnel at such a rate that the temperature did not exceed 60° C. The reaction mixture was then maintained at 50° C. for about 13 hours. The completed reaction mixture was then poured over ice, filtered, ground with ammonia, filtered, washed several times with water, and dried. The yield of the product which was recrystallized from 1400 mls. of o-dichlorobenzene was 163 grams with a melting point of 288-294° C.

Analysis

|   | Calculated | Found |
|---|---|---|
| N | 9.88 | 9.62 |

EXAMPLE III

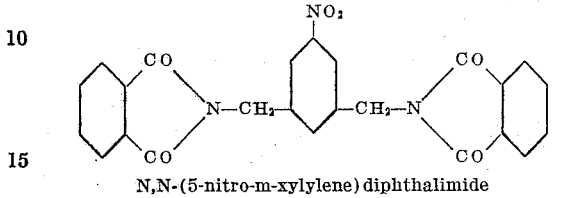

N,N-(5-nitro-m-xylylene) diphthalimide

A mixture consisting of 50 mls. of nitrobenzene, 177 mls. of N-hydroxymethylphthalimide was added to 350 mls. of 20% oleum, cooled to a temperature of about 25° C. at such a rate that the temperature of the total mixture did not exceed 60° C. The solution was allowed to stand for 48 hours and thereafter poured over ice, filtered, washed free of acid with water, and dried in an oven at 60° C. The crude product was crystallized from dichlorobenzene with a melting point at 294-298° C. After recrystallization from the same solvent, the melting point was 296-298° C.

EXAMPLE IV

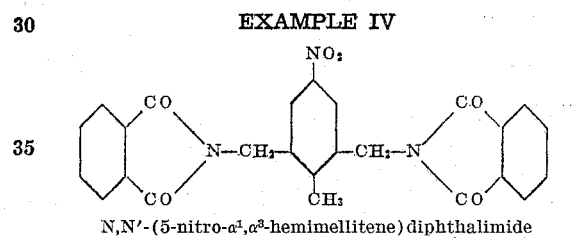

N,N'-(5-nitro-$\alpha^1,\alpha^3$-hemimellitene) diphthalimide 34 grams of p-nitrotoluene and 88.5 grams of N-hydroxymethylphthalimide were dissolved in 500 mls. of concentrated sulfuric acid with stirring at a temperature of 20-25° C. The stirring was continued until the reaction mixture was homogeneous and then allowed to stand for 3 days. The solution was then poured over ice. The precipitate was filtered, washed free of acid with water several times, and then dried in an oven. The yield of the crude product was about 95%. After two crystallizations, first from trichlorobenzene, and then from dichlorobenzene, the crystalline product melts sharply and reversibly at 292-293° C.

Analysis for $C_{25}H_{17}N_3O_6$

|   | Calculated | Found |
|---|---|---|
| N | 9.25 | 9.27 |

EXAMPLE V

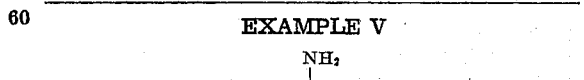
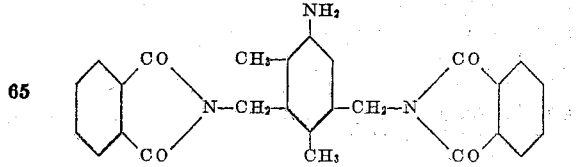

61 grams of meta-xylidine were dissolved in 500 mls. of 90% sulfuric acid with stirring at 20-25° C. To this solution, 177 grams of N-hydroxymethylphthalimide were added and the solution allowed to stand for 48 hours at room temperature. The solution was then poured over ice, filtered, ground with ammonia, filtered again and washed neutral with water. The yield of the product was 285 grams.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the following claims.

I claim:

1. An m-phthalimidomethyl derivative of the class consisting of aniline and of nitrobenzene in which the two m-positions of the benzene nucleus are substituted by a phthalimidomethyl group and the remaining positions in the benzene ring are occupied by a substituent selected from the class consisting of hydrogen, halogen, hydroxy, lower alkyl, lower alkoxy, lower hydroxyalkyl, and monocyclic carbocyclic aralkyl and aryloxy groups.

2. A dyestuff intermediate characterized by the following formula:

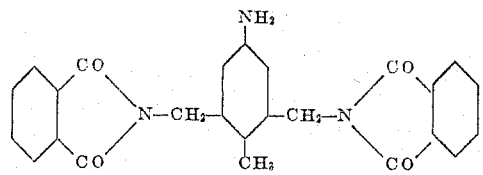

3. A dyestuff intermediate characterized by the following formula:

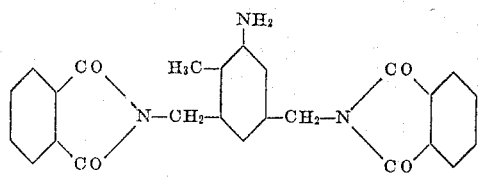

4. A dyestuff intermediate characterized by the following formula:

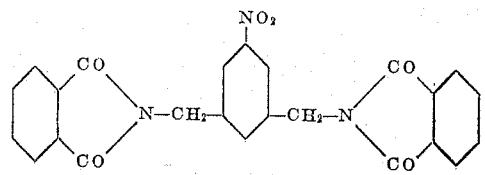

5. A dyestuff intermediate characterized by the following formula:

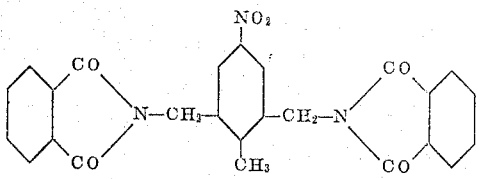

6. A dyestuff intermediate characterized by the following formula.

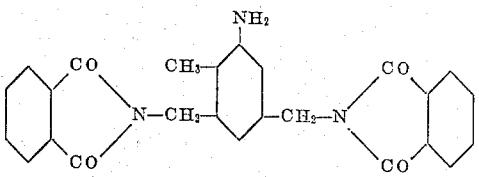

7. The process of preparing m-phthalimidomethyl derivatives of aniline, nitrobenzene, and nuclear substitution products thereof, which comprises condensing, in the presence of sulfuric acid, two moles of an N-methylolphthalimide with one mol of a compound of the group consisting of aniline, nitrobenzene, and nuclear substituted products thereof having two unoccupied positions meta to the amino and nitro group, and the remaining positions in the benzene ring are occupied by a substituent selected from the class consisting of hydrogen, halogen, hydroxy, lower alkyl, lower alkoxy, lower hydroxyalkyl, and monocyclic carbocyclic aralkyl and aryloxy groups.

8. The process which comprises condensing, in the presence of sulfuric acid, two mols of N-methylolphthalimide with one mol of p-toluidine.

9. The process which comprises condensing, in the presence of sulfuric acid, two mols of N-methylolphthalimide with one mol of o-toluidine.

10. The process which comprises condensing, in the presence of sulfuric acid, two mols of N-methylolphthalimide with one mol of nitrobenzene.

11. The process which comprises condensing, in the presence of sulfuric acid, two mols of N-methylolphthalimide with one mol of p-nitrotoluene.

12. The process which comprises condensing, in the presence of sulfuric acid, two mols of N-methylolphthalimide with one mol of m-xylidine.

SAUL R. BUC.

No references cited.